Figure 1:
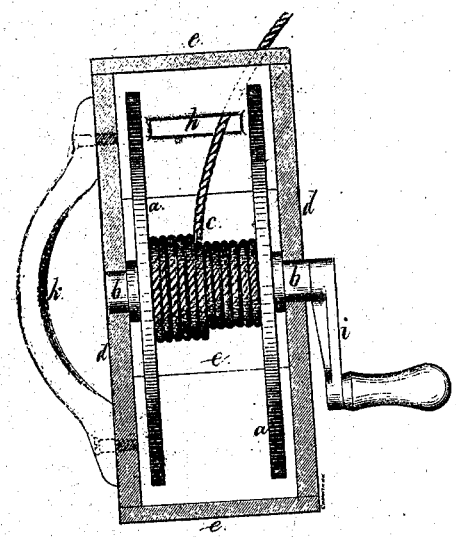

D. D. Pugh,
Clothes Line Reel.
No. 104,495. Patented June 21, 1870.

David D. Pugh

WITNESSES.
Chas. H. Smith
Harold Serrell

United States Patent Office.

DAVID D. PUGH, OF BROOKLYN, NEW YORK.

Letters Patent No. 104,495, dated June 21, 1870; antedated June 11, 1870.

IMPROVED CLOTHES-LINE REEL.

The Schedule referred to in these Letters Patent and making part of the same.

*To all whom it may concern:*

Be it known that I, DAVID D. PUGH, of Brooklyn, in the county of Kings and State of New York, have invented a new and improved Clothes-line Reel and Box Combined; and the following is hereby declared to be a full and clear description thereof.

Before my invention a box had been made attached to a post or fence, into which the clothes-line was wound, and a box had also been made that could be hung upon a hook. Neither of these devices was adapted to being carried from place to place; hence the line, as drawn out of the box, had to be carried from one post to another in the hand, and was liable to become dirty by touching the ground, and to get knotted and twisted.

My invention relates to a box containing a reel for a clothes-line, and provided with a handle, in such a manner that the box can be carried from place to place with facility, either in giving out the line or in winding it up; hence the person has only to connect the end of the line to the post or point of attachment, and carry the box to the next post, the line drawing off the reel, and being kept from the ground and from becoming twisted or knotted, the reverse operation being performed in winding up the line, the person rotating the reel within the box, while walking from one point of attachment to the next.

In the drawing—

$a\ a$ are circular heads upon the axis $b$, forming a reel for the clothes-line $c$.

$d\ d$ are the heads, and $e$, the sides of a box inclosing the reel, the same being either cylindrical or polygonal, as shown, and in one side of the box is a cover or slide, $f$, secured by a button, $g$, so as to give access to the reel for attaching the line, and $h$ is a slot in the side, through which the line $c$ passes out.

The handle $k$ is attached to the box at the opposite end to that at which the crank $i$ projects from the arbor or axis $b$ of the clothes-line reel.

In Figure 1 the box is shown sectionally, and

Figure 2:
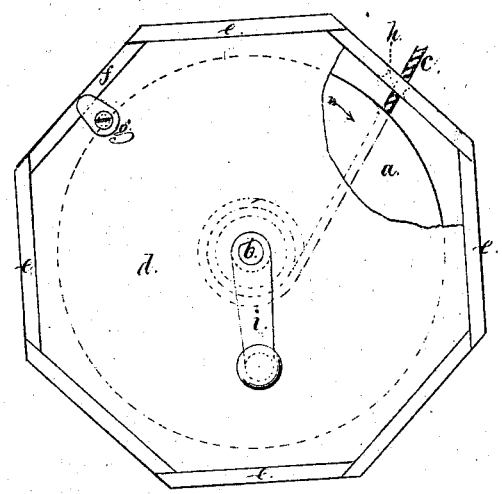

In Figure 2 one end of the box is shown partially broken open.

It will be seen that this box and reel combined is very convenient in use, and keep the line in good condition.

What I claim as my improvement in portable clothes-line reel and box is—

The arrangement of the handle $k$, in combination with box $d\ e$, reel $a$, and crank $i$, as constructed and shown, for the purpose described.

Dated November 26, A. D. 1869.

DAVID D. PUGH.

Witnesses:
CHAS. H. SMITH,
GEO. T. PINCKNEY.